Patented Mar. 8, 1927.

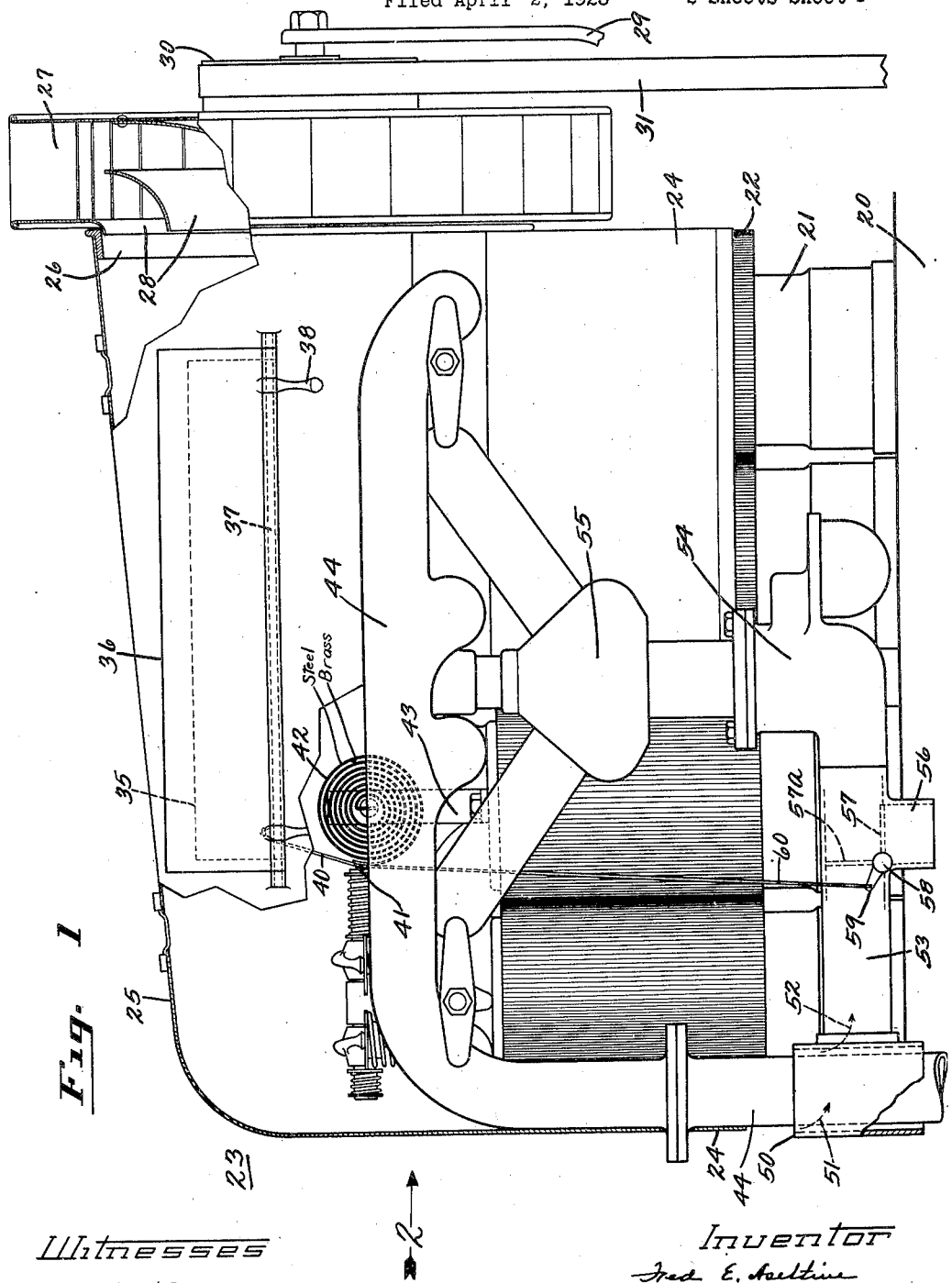

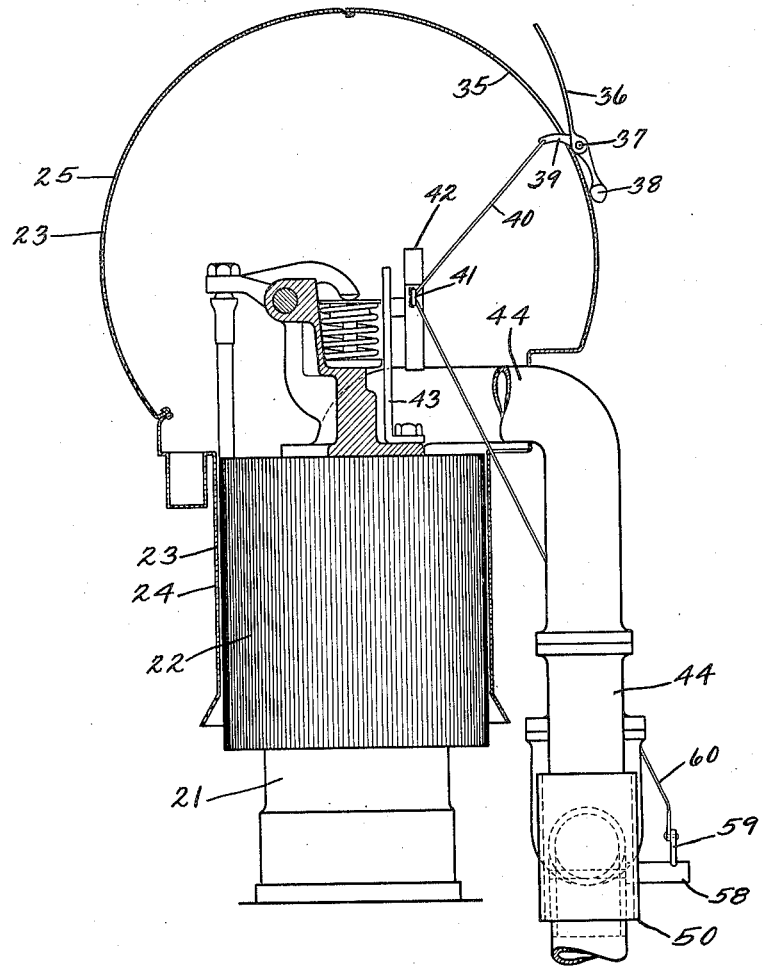

1,619,965

UNITED STATES PATENT OFFICE.

FRED E. ASELTINE, OF DAYTON, OHIO, ASSIGNOR TO GENERAL MOTORS RESEARCH CORPORATION, OF DAYTON, OHIO, A CORPORATION OF DELAWARE.

INTERNAL-COMBUSTION ENGINE.

Application filed April 2, 1923. Serial No. 629,261.

This invention relates to means for controlling the heat within an internal-combustion engine and particularly within the combustion chamber.

Among the objects of the invention are to provide means responsive to the temperature of the engine for controlling the cooling system of the engine and for controlling the temperature of the fuel mixture passing into the engine, in order that the engine fuel may arrive at the combustion chamber in a condition to be readily ignited and in order to permit sufficient heat to be retained by the engine so that the engine may operate efficiently but without excessive heating.

Another object of the invention is to provide means for controlling the circulation of air about or past an engine cylinder in response to the temperature of the cylinder.

Further objects and advantages of the present invention will be apparent from the following description, reference being had to the accompanying drawings, wherein a preferred embodiment of the present invention is clearly shown.

In the drawings:

Fig. 1 is a side elevation of an internal-combustion engine including the present invention, certain parts being broken away; and Fig. 2 is an end elevation looking in the direction of arrow 2 of Fig. 1, the draft tube being shown in section.

Internal-combustion engine 20 includes a plurality of cylinders 21 provided with air-cooling fins or fin loops 22 attached preferably by a method and apparatus described in co-pending application of Charles F. Kettering, Serial No. 514,014, filed November 9, 1921. The finned portions of the cylinders are surrounded by a draft tube 23 having a skirt portion 24 and overhead or manifold portion 25 which terminates in a circular orifice 26 at one end of the engine. An air cooling fan 27 having an intake 28 in communication with the outlet orifice 26 is mounted upon the engine by means including a bracket 29, and is driven by means of a pulley 30 and belt 31 connected with an engine pulley not shown. As more fully described in the co-pending application of Charles F. Kettering and Charles R. Short, Serial No. 553,938, filed April 17, 1922, rotation of the fan 27 causes air to be drawn upwardly along the cooling fins 22 through the manifold 25 and then to be discharged by the fan in the surrounding atmosphere.

In order that the engine may warm up quickly when being started the amount of air drawn past the cooling fins should be very little as compared to that necessary for cooling the engine during running under load. Therefore the air circulating apparatus is provided with mechanism responsive to the temperature of the engine for controlling the air circulation, in order that the circulation may be less when the engine is cold, and greater when the engine is hot. That part of the draft tube 23 between the cylinders and the fan 27, namely the manifold portion 25, is provided with an opening 35 in the side thereof which may be closed by shutter or valve 36 pivoted at 37 and provided with a counterbalance 38 which acts as a stop as shown in Fig. 2. The valve 36 is provided with an arm 39 connected by link 40 with the free end 41 of a coil of thermostatic metal in which the steel layer is located on the outside and the brass layer on the inside as viewed in Fig. 1. When the coil 42 is heated the free end 41 will move downwardly as viewed in the drawings to close the valve 36 thereby increasing the circulation of air about the cylinders as produced by the fan 47. Normally the valve 36 is open and a degree of opening depends on the outside temperature. In very cold weather the opening will be the maximum and in warmer weather the opening will be slightly less. This feature is advantageous since it provides for less circulation of air about the cylinders during the warming up period in cold weather than during the warming up period in warm weather.

As the engine becomes heated during its self operation the valve 36 will move to closed position more or less depending on the amount of heat developed by the engine cylinders thereby controlling the air circulating system so that the cylinder will be kept at the proper temperature for efficient operation. The air circulating system is constructed so that when the valve 36 is entirely closed the necessary amount of air will be drawn past the cylinders to prevent excessive heating.

The thermostat 42 may be located in any convenient position with respect to the engine but is preferably mounted directly over one of the engine cylinders upon a suitable bracket 43 so as to receive heat from the cylinder head and the exhaust manifold 44.

It is advantageous to control the temperature of the fuel mixture passing through the engine in accordance with the amount of heat being developed by the engine in order to provide for the vaporizing of the fuel and the efficient operation of the engine under varying conditions of the temperature. Generally during the operation of the engine, engine heat will be conducted from the cylinders to the intake manifold to warm up the mixture; but, during the starting of the engine, before the intake is warmed up, it is desirable to warm the air passing into the carburetor. For this purpose there is provided a stove 50 providing a jacket around a portion of the exhaust pipe 44 into which air can enter as indicated by the arrow 51 and pass out as indicated by arrow 52 into a pipe 53 leading to the carburetor 54, attached to the engine intake 55. The pipe 53 is provided with a branch passage 56 communicating directly with the atmosphere. The valve 57 is mounted on a shaft 58 provided with an arm 59 attached by link 60 to the free end 41 of thermostat 42. This valve 57 controls the passage of air directly from atmosphere or from the stove 50 to the carburetor 54. When the engine is cold the valve 57 will be in a position indicated in Fig. 1 so that all the air passing to the carburetor must first pass through the stove 50. As the engine warms up the link 60 will be moved downwardly causing the valve 57 to move toward the position 57ª in Fig. 1, the amount of movement depending on the temperature surrounding the head of the engine cylinder head. As the engine heats up the intake 55 will receive heat from the engine to heat the fuel mixture, and communication between the carburetor and the stove can be partly or wholly closed depending on cylinder head temperature.

From the foregoing it is apparent there has been provided means for controlling the operation of the engine in accordance with its temperature so that the engine may warm up quickly and vaporize its fuel properly for the effective operation of the engine. By providing for the quick warming up of the engine a waste of fuel is prevented and also the dilution of the engine lubricating oil is reduced because of the reduction of the condensation of the fuel in the engine cylinders. At the same time the engine is protected against excessive heating of the engine cylinders and also excessive heating of the fuel mixture.

While the form of mechanism herein shown and described constitutes a preferred form of embodiment of the invention, it is to be understood that other forms might be adopted, all coming within the scope of the claims which follow:

What I claim is as follows:

1. In an engine cooling system, the combination with air circulating means including a draft tube arranged adjacent the head of the engine and surrounding a portion thereof, and a fan driven by the engine and adapted to induce a flow of air past the portion aforesaid and through said draft tube by suction, said draft tube having an opening through which air may enter thereinto without flowing past the engine cylinder; a valve carried by said draft tube and adapted to control the flow of air thereinto through said opening; and a thermostat operatively connected with said valve to control the same.

2. In a multiple cylinder internal combustion engine, a draft tube arranged adjacent and extending along the heads of the cylinders of the engine and partially down the sides thereof, so that air may flow past said cylinders and into said draft tube; a fan driven by the engine and located at one end of said draft tube; and which fan is adapted to produce a flow of air past said cylinders and into said draft tube by suction, said draft tube having an opening therein extending longitudinally thereof; a pivotally supporting valve carried by said draft tube and adapted to control the flow of air through said opening; and a thermostat operatively connected with said valve and adapted to operate the same, to thereby regulate the flow of air into said draft tube.

In testimony whereof I hereto affix my signature.

FRED E. ASELTINE.